United States Patent
Mitra et al.

(10) Patent No.: US 11,637,328 B2
(45) Date of Patent: Apr. 25, 2023

(54) METHODS AND DEVICES FOR HIGH-CAPACITY FLEXIBLE, PRINTABLE, AND CONFORMAL PERIODATE AND IODATE BATTERIES

(71) Applicant: New Jersey Institute of Technology, Newark, NJ (US)

(72) Inventors: Somenath Mitra, Bridgewater, NJ (US); Zhiqian Wang, Kearny, NJ (US)

(73) Assignee: New Jersey Institute of Technology, Newark, NJ (US)

(*) Notice: Subject to any disclaimer, the term of this patent is extended or adjusted under 35 U.S.C. 154(b) by 79 days.

(21) Appl. No.: 17/123,263

(22) Filed: Dec. 16, 2020

(65) Prior Publication Data
US 2021/0194065 A1    Jun. 24, 2021

Related U.S. Application Data

(60) Provisional application No. 62/949,837, filed on Dec. 18, 2019.

(51) Int. Cl.
*H01M 10/00* (2006.01)
*H01M 10/38* (2006.01)
(Continued)

(52) U.S. Cl.
CPC ......... *H01M 10/38* (2013.01); *H01M 4/0404* (2013.01); *H01M 4/38* (2013.01);
(Continued)

(58) Field of Classification Search
CPC .. H01M 2300/0085; H01M 6/40; H01M 6/04; H01M 2300/0091; H01M 4/661; Y02E 10/60
See application file for complete search history.

(56) References Cited

U.S. PATENT DOCUMENTS

| | | | |
|---|---|---|---|
| 4,060,676 A | 11/1977 | Dey et al. | |
| 4,470,939 A | 9/1984 | Schoolcraft | |

(Continued)

FOREIGN PATENT DOCUMENTS

| | | |
|---|---|---|
| DE | 2755797 A1 | 7/1979 |
| WO | 2014136813 A1 | 9/2014 |
| WO | 2019012012 A1 | 1/2019 |

OTHER PUBLICATIONS

Nyström G, Marais A, Karabulut E, Wågberg L, Cui Y, Hamedi MM. Self-assembled three-dimensional and compressible interdigitated thin-film supercapacitors and batteries. Nature communications. May 29, 2015;6:7259.

(Continued)

*Primary Examiner* — Cynthia H Kelly
*Assistant Examiner* — Monique M Wills
(74) *Attorney, Agent, or Firm* — Lerner David LLP

(57) ABSTRACT

Development of a flexible battery based on periodate/iodate-zinc system is disclosed. $H_3PO_4$—KCl dual quasi-solid electrolytes separated by an anion-exchange-membrane maintain the desired pH in electrodes and block unwanted ion movements. Poly(acrylic acid) fortifies the electrodes, enhances electrode flexibility, and avoids the free-flow of liquids. The $NaMnIO_6$ shows a specific capacity of 650 $mAg^{-1}$, approximately 81% of its theoretical capacity even when cells are bent. The overall technology is scalable by printing methods.

19 Claims, 7 Drawing Sheets
(6 of 7 Drawing Sheet(s) Filed in Color)

(51) Int. Cl.
- H01M 4/38 (2006.01)
- H01M 4/58 (2010.01)
- H01M 4/62 (2006.01)
- H01M 4/66 (2006.01)
- H01M 4/74 (2006.01)
- H01M 50/489 (2021.01)
- H01M 4/04 (2006.01)

(52) U.S. Cl.
CPC ......... *H01M 4/5825* (2013.01); *H01M 4/623* (2013.01); *H01M 4/661* (2013.01); *H01M 4/663* (2013.01); *H01M 4/74* (2013.01); *H01M 50/489* (2021.01); *H01M 2300/0008* (2013.01); *H01M 2300/0085* (2013.01); *H01M 2300/0091* (2013.01)

(56) References Cited

U.S. PATENT DOCUMENTS

| | | |
|---|---|---|
| 2008/0261094 A1 | 10/2008 | Licht et al. |
| 2010/0121166 A1 | 5/2010 | Heller et al. |
| 2013/0004836 A1 | 1/2013 | Otsuka et al. |
| 2014/0147723 A1* | 5/2014 | Tucholski ............... H01M 4/70 429/124 |
| 2015/0014581 A1 | 1/2015 | Kawakami et al. |
| 2016/0190547 A1 | 6/2016 | Schweiss |
| 2016/0261005 A1 | 9/2016 | Rustomji et al. |
| 2017/0025646 A1 | 1/2017 | Ota et al. |
| 2017/0229730 A1 | 8/2017 | Flitsch et al. |
| 2018/0069241 A1* | 3/2018 | Palazzo ................ C01G 51/006 |
| 2018/0166743 A1* | 6/2018 | Lee ....................... H01M 4/624 |
| 2018/0183052 A1* | 6/2018 | Zhamu ................... H01M 4/75 |
| 2019/0348705 A1 | 11/2019 | Chen et al. |
| 2021/0273215 A1* | 9/2021 | Shao-Horn ......... H01M 4/5825 |

OTHER PUBLICATIONS

Wang Z, Meng X, Chen K, Mitra S. Synthesis of carbon nanotube incorporated metal oxides for the fabrication of printable, flexible nickel-zinc batteries. Advanced materials interfaces. Feb. 2018;5(4):1701036.

* cited by examiner

METHODS AND DEVICES FOR HIGH-CAPACITY FLEXIBLE, PRINTABLE, AND CONFORMAL PERIODATE AND IODATE BATTERIES

CROSS REFERENCE TO RELATED APPLICATION

This application claims priority from U.S. provisional application No. 62/949,837 filed Dec. 18, 2019, the disclosure of which is hereby incorporated herein by reference.

FIELD OF DISCLOSURE

The present disclosure relates to periodate batteries and iodate batteries. In particular, the present disclosure relates to a high capacity, flexible periodate battery based on quasi-solid polymer electrolytes and printable flexible electrodes.

BACKGROUND

High energy density, specific capacity, safety, low toxicity, and costs are just a few considerations important in electrochemical energy storage. Many conventional batteries such as zinc-based ones are based on single-electron cathode processes with limited capability. Zinc-ion batteries built on water-based electrolytes feature compelling pricepoints, and enhanced safety as compared to current lithium-ion battery systems. Attempts to develop rechargeable aqueous batteries, despite achievements made, have fallen short of reaching its objectives. Significant challenges remain at the material level and even on the whole battery system.

In addition, flexible batteries are promising power sources for future portable electronics, such as wearable sensors, implanted medical devices, bendable screens, and smart cards. Various batteries have been converted and fabricated in flexible/conformal forms. These include zinc-$MnO_2$, zinc-air, nickel-zinc, Ni—Fe, Co—Zn, sodium-ion, and lithium-based systems. Recently, there has been much development in lithium-ion and other rechargeable batteries, yet the aqueous primary battery technology development has made little progress in decades.

Batteries generally include an anode, a cathode, and an electrolytic solution. During a charge, an anode is a positive electrode, and a cathode is a negative electrode. During discharge of a device, the cathode is positive charged electrode and the anode is negative charged electrode. Electrons typically move between the anode and the cathode. Battery capacity is measured in milliamps×hours (mAh).

Aqueous primary batteries are generally non-flammable, inexpensive and less toxic mostly. They typically use zinc anodes, with a metal oxide such as $MnO_2$ as the cathode. Yet with anode capacity high (820 mAh $g^{-1}$), the cathode materials are the bottlenecks: 308 mAh $g^{-1}$ for $MnO_2$, 231 mAh $g^{-1}$ for $Ag_2O$, 247 mAh $g^{-1}$ for HgO. Metal-air cells utilizing oxygen possess high specific capacity; however, the concentration of $O_2$ limits the output power. Besides, as the system is open to the air, undesired issues like $CO_2$ absorption and water evaporation emerge.

However, traditional batteries lack, among other things, capacity. It is, therefore, necessary to adopt novel cathode materials with high specific capacities.

Thus there still remains a need in the art for a flexible battery that provides high energy density, specific capacity, safety, low toxicity, and low cost in manufacturing the electrochemical energy storage.

BRIEF SUMMARY OF THE INVENTION

Compared to the current state of the art, the present disclosure fulfills the above criteria and provides additional benefits that state of the art systems cannot provide. Iodates exhibit a similar process from I(V) to $I_2$, making them also promising electrode materials. Double salts provide extra capacity as the high-oxidation-state metals become reduced: $NaMnIO_6$ featuring a 9 $e^-$ process has a capacity of 802 mAh $g^{-1}$.

The present method utilizes the flexibility of fabrics and the space among fibers. Conductive fabrics also serve as a current collector when electroactive materials are dip-coated or electroplated onto the substrates. While direct growing methods ensure the contact between current collectors and active ingredients, the fabrication has been complicated. Another method disclosed herein uses directly casted electrode inks onto conductive substrates, which is suitable for mass production using commercially available printing techniques. This way, the overall technology is scalable by printing methods and lowers cost.

In accordance with embodiments of the present disclosure, a dual electrolyte, flexible battery is disclosed. In one embodiment, a dual electrolyte, flexible battery based on a periodate-zinc system is disclosed. In one embodiment, a prototype flexible periodate battery uses acid-salt dual electrolytes separated by an anion-exchange-membrane (AEM), for example, Fumasep FAB-PK-130, a polyketone (PK) reinforced. AEM, such as 30% glass fiber reinforced, with high proton blocking capability, high selectivity, very high mechanical stability, and high stability in acidic and caustic environment. The polymer backbone for this AEM is based on a hydrocarbon polymer material. Depending on the implementation the membrane may be an ion-exchange membrane. The ion exchange membrane is a semi-permeable membrane that transports certain dissolved ions, while blocking other ions or neutral molecules. Ion-exchange membranes are therefore electrically conductive. An example of ion-exchange membranes include, but are not limited to, proton-exchange membranes that transport $H^+$ cations, and the anion exchange membranes used in certain alkaline fuel cells to transport $OH^-$ anions.

Batteries featuring polymer based quasi-solid electrolytes, which would improve the adaptability and broaden the application of periodate and iodate battery systems, are disclosed. Examples of suitable quasi-solid electrolytes include, but are not limited to, poly(acrylic acid) (PAA), polyethylene oxide, polyacrylate, and starch. In one embodiment, batteries using poly(acrylic acid) (PAA) based electrolytes are disclosed.

In another aspect, a process for battery fabrication is disclosed. A prototyping approach can be taken of flexible battery fabrication where electrode inks can be printed onto current collectors, dried, and then fortified by an electrolyte layer for flexibility and mechanical strength. This fortification method is also applicable to other electrochemical device electrodes including batteries and capacitors.

In yet another aspect, a thin film battery with dual electrolytes is disclosed. The thin-film battery could be integrated into a flexible material, such as a medical patch or an RFID tag. In one embodiment, the electrode is designed to be in ink form to allow the electrode to be printed or painted.

In another aspect, a flexible battery is disclosed having a plurality of current collectors including a positive current collector and a negative current collector. The flexible battery further includes an insoluble solid iodate or a periodate cathode, and an anode. The cathode is in communication with the positive current collector and the anode is in communication with the negative current collector. At least one electrolyte forming a cathode electrolyte and an anode electrolyte is included. The cathode is in communication with the cathode electrolyte and the anode is in communication with the anode electrolyte. A separator, such as an ion or anion exchange membrane, is included for separating the cathode and the anode.

At least one of the cathode electrolyte or the anode electrolyte is embedded in a polymer for enhancement of electrode flexibility and avoidance of free-flow of liquid electrolyte. Avoidance of free-flow of liquid electrolyte include for example, but not limited to, when the electrolyte is somewhat viscous or almost solid, as in for example, a polymer electrolyte, the electrolyte does not flow or access alternatively charged electrodes and short circuit the electrodes.

In still another aspect, the flexible battery includes a periodate cathode containing a polyvinylpyrrolidone (PVP) binder or an iodate cathode containing a polyvinylpyrrolidone (PVP) binder. A poly(acrylic acid) (PAA) is part of an electrolyte for the cathode. A zinc based anode may be used with a dual quasi-solid phosphoric acid-potassium chloride ($H_3PO_4$—KCl) electrolytes for a cathode electrolyte-anode electrolyte combination.

An anion-exchange membrane for separating the cathode electrolyte and the anode electrolyte may be used to, among other things, maintain a desired pH, such as, but not limited to lower than 2 for the cathode and higher than 5.5 for the anode for the above dual-electrolytes. The membrane blocks movement of $H^+$ ions to anode that cause anode corrosion, and poly(acrylic acid) fortifies the cathode to enhance flexibility and avoid free-flow of electrolyte liquid.

Further in another aspect of the method of making a flexible battery with the principles disclose herein include the following. The method includes forming a cathode side of a flexible battery by placing together a carbon fabric layer, a cathode slurry layer, and a cathode electrolyte layer. An anode side of the flexible battery is formed by placing together a layer of a metal current collector such as, but not limited to, zinc mesh layer, an anode reactant layer if the current collector metal is different from anode reactant, and an anode electrolyte layer.

The method further includes placing an ion exchange membrane separator between the cathode side and the anode side of the flexible battery, and assembling the cathode side, separator, and anode side of the flexible battery into a package for sealing.

Depending on the embodiment, the method further includes printing electrode inks onto current collectors, drying the electrode inks, and then fortifying by the non-fluid electrolyte layers for flexibility and mechanical strength.

Any combination and/or permutation of the embodiments is envisioned. Other objects and features will become apparent from the following detailed description considered in conjunction with the accompanying drawings. It is to be understood, however, that the drawings are designed as an illustration only and not as a definition of the limits of the present disclosure.

BRIEF DESCRIPTION OF THE DRAWINGS

The patent or application file contains at least one drawing executed in color. Copies of this patent or patent application publication with color drawings(s) will be provided by the Office upon request and payment of the necessary fee.

To assist those of skill in the art in making and using the disclosed battery system and associated systems and methods, reference is made to the accompanying figures, wherein.

DETAILED DESCRIPTION

Exemplary embodiments are directed to a flexible, printable periodate battery. It should be understood that embodiments could generally be applied to other types of batteries. One embodiment of a battery comprising a sodium manganese periodate complex cathode and zinc anode is disclosed. In this embodiment, the periodate complex $NaMnIO_6$ was prepared by a redox-precipitation reaction between $MnSO_4$ and $NaIO_4$. It will be understood that the other types of periodate complexes and iodates could be employed, such as $KMnIO_6$, $NaNiIO_6$, $NaPbIO_6$, $H_7Fe_4(IO_4)_3O_8$, $Pb(IO_3)_2$, $Mn(IO_3)_2$, $Zn(IO_3)_2$, $AgIO_3$. Mn and Fe can be replaced by Pb, Co, Cr, Ge, Sn or other metals.

Another embodiment of a battery comprising a PAA based $H_3PO_4$—KCl dual electrolyte is disclosed. It will be understood that the other types of acid and salt could be employed for an electrolyte, and other oxidation-resistant polymers as matrix.

The materials and the methods of the present disclosure used in one embodiment will be described below. While the embodiment discusses the use of specific compounds and materials, it is understood that the present disclosure could employ other suitable materials. Similar quantities or measurements may be substituted without altering the method embodied below.

Figures 1A, 1B, 1C, 1D:
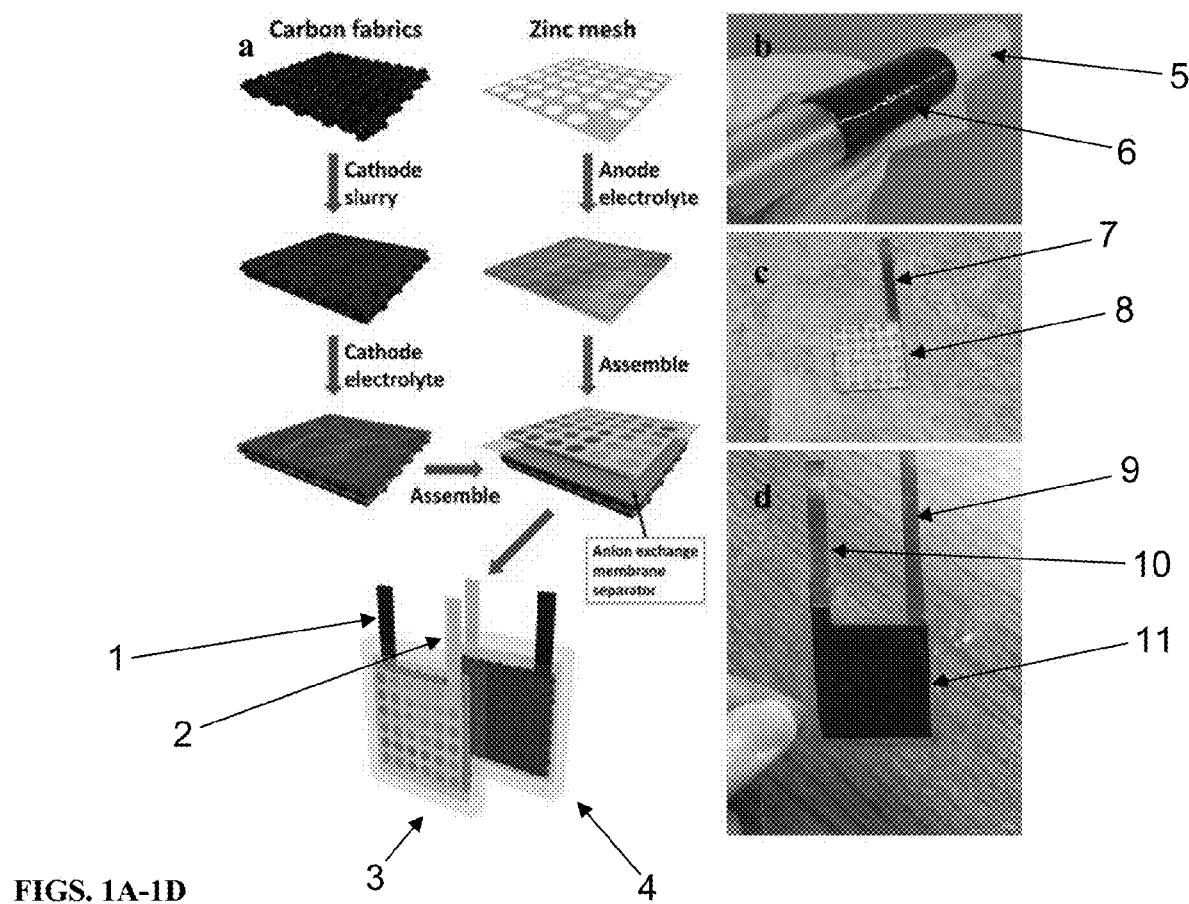
FIGS. 1A-1H show (a) a process to fabricate flexible $NaMnIO_6$ batteries; (b) a photograph of a flexible $NaMnIO_6$ cathode with a PAA-$H_3PO_4$ layer; (c) a photograph of a zinc anode with an electrolyte; (d) a photograph of an assembled battery; scanning electron microscopy (SEM) images of: (e)&(f) cathode under various magnifications; (g) cathode with PAA-$H_3PO_4$ electrolyte; (h) zinc anode with polymer, in accordance with one embodiment of the present disclosure; and Scale bars for (e), (g), (h)=100 μm; and (f)=1 μm.

A flow diagram illustrating one embodiment of a fabrication process for flexible $NaMnIO_6$—Zn cells is shown in FIG. 1A. For the cathode, electrically conductive but chemically inert carbon cloth served as the matrix, on which electrode ink was pasted. The cathode ink was dried before cathode $H_3PO_4$-PAA electrolyte solution was loaded. As shown in FIG. 1A and FIG. 1D is a battery 11 having an anode side 3 and a cathode side 4. The battery has current collectors include an anode current collector 2 and a cathode current collector 1, which are the same as current collectors 9 and 10 shown in FIG. 1D.

Surface tension held the solution on the electrode until sufficient water evaporated; then the electrolyte solution turned into a film 6, which is the cathode electrolyte layer that not only provided ions for electrochemical reactions but also fortified the cathode and enhanced its flexibility, as shown in FIG. 1B. Layer 5 is illustrative of a packaging/substrate used for the battery.

While previous electrodes cracked and disintegrated upon drying and bending, the periodate electrode in the present embodiment is stable under bending conditions due to the PAA layer. In the present disclosure, utilized was zinc mesh as both an anode reactant and a current collector. The mesh may be any metal mesh, including but not limited to gold, copper, silver, and other conductive metals.

Anode polymer solution was also cast onto an electrode 8 having current collector 9 or 2 for the anode electrolyte, and dried. Before a cell or battery 11 was assembled, saturated KCl electrolyte was added to the anode and absorbed by a polymer or a sheet 7, as shown in FIG. 1C and FIG. 1A. With the anion-exchange membrane separator between cathode and anode, the cell was thermally sealed. FIG. 1D shows one embodiment of such an assembled cell 11 with current collectors, anode current collector 9 and cathode current collector 10, which are the same in function and properties as anode collector 2 and a cathode collector 1, respectively.

Figures 1E, 1F, 1G, 1H:
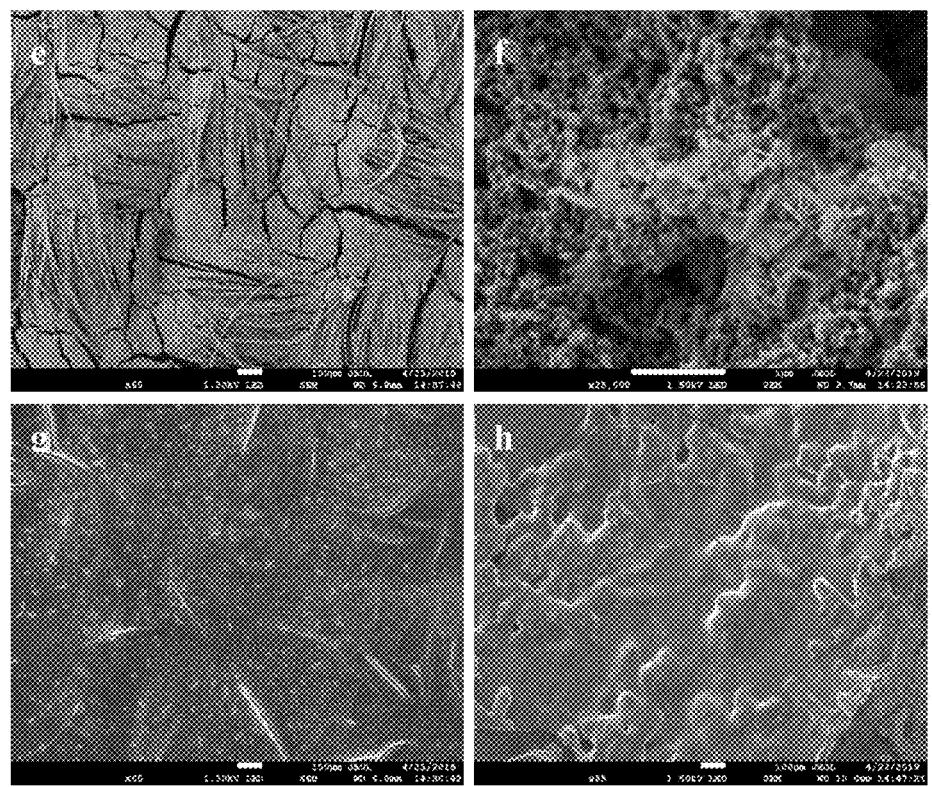

Scanning electron microscopy (SEM) images in FIG. 1E-1H show the flexible electrodes. Electroactive particles, as well as carbon conductive additives, were filled among the carbon cloth fibers. Cracks, as illustrated in FIG. 1E, formed during the drying process indicated the necessity of the fortification layer to maintain electrode integrity (FIG. 1G), especially when an electrode was bent. These cracks also allowed the electrolyte to penetrate and soak the cathode, enhancing phase contact and facilitating electrochemical reactions.

Referring to FIG. 1F, under high magnifications, submicron $NaMnIO_6$ particles could be observed. Under acidic conditions, periodates can be reduced to iodine. The reaction in the present embodiment is proposed as below:

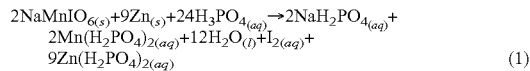

$$2NaMnIO_{6(s)}+9Zn_{(s)}+24H_3PO_{4(aq)} \rightarrow 2NaH_2PO_{4(aq)}+ 2Mn(H_2PO_4)_{2(aq)}+12H_2O_{(l)}+I_{2(aq)}+ 9Zn(H_2PO_4)_{2(aq)} \quad (1)$$

During the discharge, iodine was produced, which might further combine with PVP to form brown iodopovidone. Polymers were tested to form polymer/gel electrolytes and hold the liquid within. Capability to hold aqueous solutions, stability in acids, low toxicity, and resistivity to oxidation are desired characteristics. Depending on the embodiment, when the electrolyte is somewhat viscous or almost solid, as in for example, a polymer electrolyte, the electrolyte does not flow or access alternatively charged electrodes and short circuit the electrodes.

Poly(acrylic acid) (PAA) is a promising candidate, as its carboxylic groups provided the desired properties mentioned above. Other hydrophilic polyacids without reducing groups such as polybutylic acid, and polyacrylates can also be used. Especially, $PAA-H_3PO_4$ polymer electrolyte is also suitable for electrodes containing oxidizing materials, while other combinations like—polyvinyl alcohol (PVA)-$H_3PO_4$ can be oxidized. PAA-KOH can also absorb salt solution to form a quasi-solid electrolyte, as can be seen in FIG. 1H. In one embodiment, chosen was non-volatile, non-oxidizing, non-toxic and inexpensive $H_3PO_4$ as the cathode acid electrolyte.

In non-alkaline electrolytes, during the discharge, zinc metal became $Zn^{2+}$ cations and migrated into the electrolyte. The original ions in the anode electrolyte only moved to provide conductivity without taking part in chemical reactions. $Na_2SO_4$ was initially tested as an anode electrolyte.

Figures 2A, 2B, 2C, 2D:
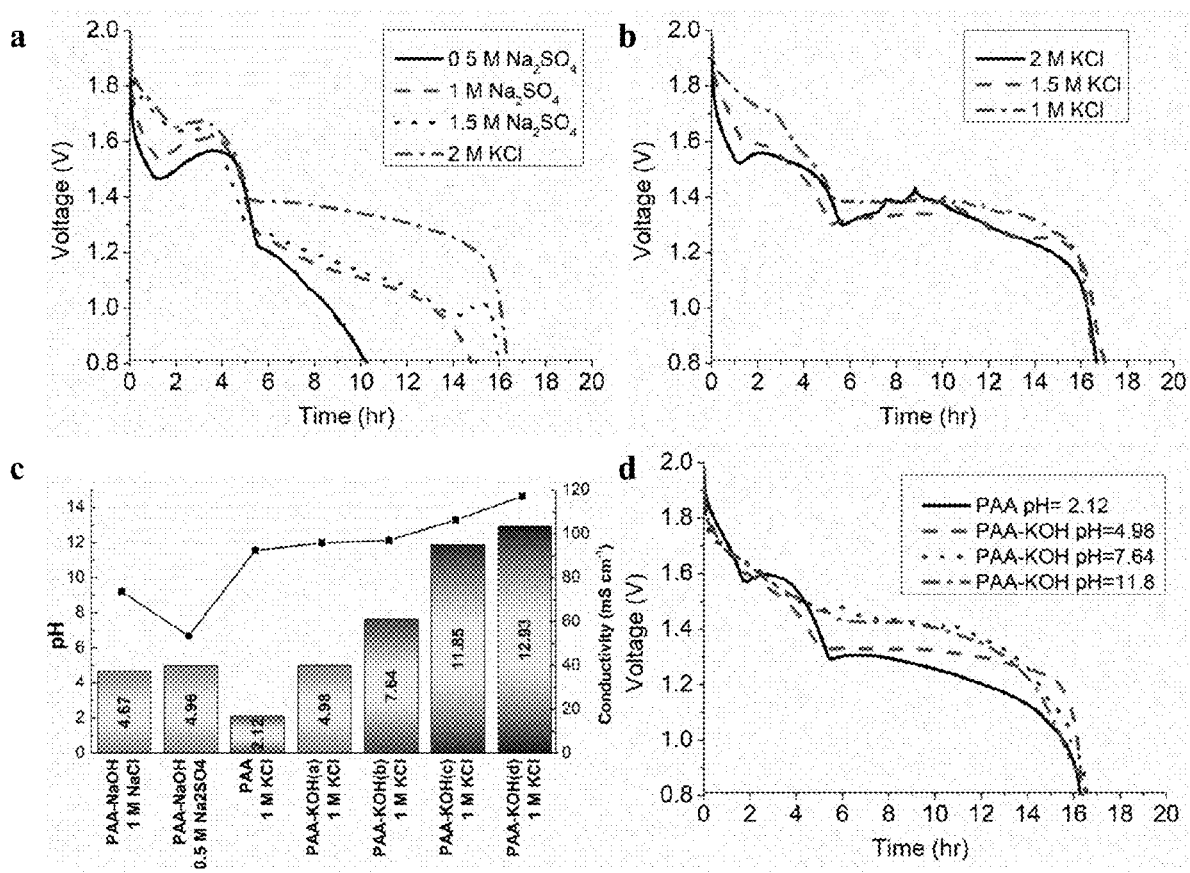
FIGS. 2A-D show graphical depictions illustrating (a) cells with PAA-$Na_2SO_4$ anode electrolyte; (b) cells with PAA-KCl anode electrolyte; (c) conductivity and pH of electrolyte solutions; (d) influence of anode electrolyte pH.

When preparing PAA aqueous solutions, it was found that higher PAA concentration significantly increased viscosity, hampering stirring and dissolving. PAA was dissolved in deionized (DI) water before salt was added to prepare various electrolytes: 0.5 M, 1 M, 1.5 M $Na_2SO_4$. As seen in FIG. 2A, higher concentration of $Na_2SO_4$ brought higher discharge time and hence capacity. The improvement in performance could attribute to higher electrical conductivity due to higher solution concentration. The use of 2M KCl, with better conductivity, further enhanced the performance.

It was also found that with higher salt concentrations, polymers tended to precipitate. Less concentrated PAA-KCl solutions were prepared with various amount of KCl at 1 M, 1.5 M and 2 M respectively, as illustrated in FIG. 2B. This way, electrolytes with more KCl can be prepared without PAA precipitation. The amount of anode electrolyte in each cell was also changed to reduce the amount of polymer. The reason was that during the battery fabrication process, an excess amount of PAA made packaging process more difficult and decreased cell flexibility.

With reference to FIG. 2A and FIG. 2B, it was found that decreasing the total amount of anode electrolyte did not drop total cell capacity. Initially capacity slightly increased as KCl molarity increased to 1.5 M. Yet when concentration was elevated to 2 M, no further improvement was observed. High concentration of KCl could also absorb the water produced in cathode reaction. The uneven KCl crystals formed during the drying process also made cell assembly difficult. As a result, adopted was 1.6 M KCl as the final electrolyte solution in one embodiment.

The present investigation showed that Zn is more stable between pH 4 and 11. PAA corroded zinc anode as a weak acid. Referring now to FIG. 2C and FIG. 2D, the non-neutralized PAA and neutralized PAA-KOH solutions with multiple pH values were tested. For the prepared polymer-salt solutions, ionic conductivity increased with pH. This is because PAA itself was a weak electrolyte; when neutralized with KOH to form salts, ionic concentration increased. The PAA and KOH react to form potassium polyacrylate. To partially, or even fully replace PAA, direct use of polyacrylates should also be viable. KCl also was a better conductor than NaCl and $Na_2SO_4$.

Yet based on the present observations from this disclosure, the influence from electrolyte was less significant, as cell assembly and packaging rendered more impact. The main purpose of neutralization was to inhibit the corrosion of zinc for longer-term storage. The PAA-KOH solution with a pH between 7 and 8 containing 1.6 M KCl was determined to be an optimum choice as an anode electrolyte solution.

Also investigated herein was the addition of salts to improve the cathode electrolyte conductivity. Yet these salts did not bring improvement to cell performance. Some of the anions like $SO_4^{2-}$ tended to acquire $H^+$, decreasing the amount of $H^+$ available for cathode reaction. Another issue was that these salts caused the salt-out effect of polymers, destroying the structure of polymer electrolyte.

After other minor technical optimizations for higher flexibility and easier fabrication, fabricated herein were flexible batteries for bending and rate performance tests. These cells included active material areas of 3 cm×3 cm, with cathode loading of 7 mg cm$^{-2}$ (limiting reagent). The cathode contained periodate or iodate solid particles, conductive additives, and a binder.

In one embodiment, an optimized periodate electrode contained 15% conductive carbon black, 5% polyvinylpyrrolidone (PVP), and 80% NaMnIO$_6$. Different from the non-flexible cells, the flexible cell electrode must have lower amount of carbon materials to avoid electrode cracking during drying. A periodate or iodate percentage of at least 80% is preferred, with the low-density carbon clack no more than 16%. Application of high amount of nano-grade carbons causes electrode unevenly distribution, cracking and hence disintegration upon drying.

It should be noted that an excess amount of liquid would cause packaging failure when electrode or electrolyte was squeezed out. One way to control the amount of liquid in anode is to totally dry the PAA-KOH—KCl layer, and then add a certain amount of liquid (saturated KCl in this embodiment) to be absorbed by the polymer.

Figures 3A, 3B, 3C, 3D, 3E:
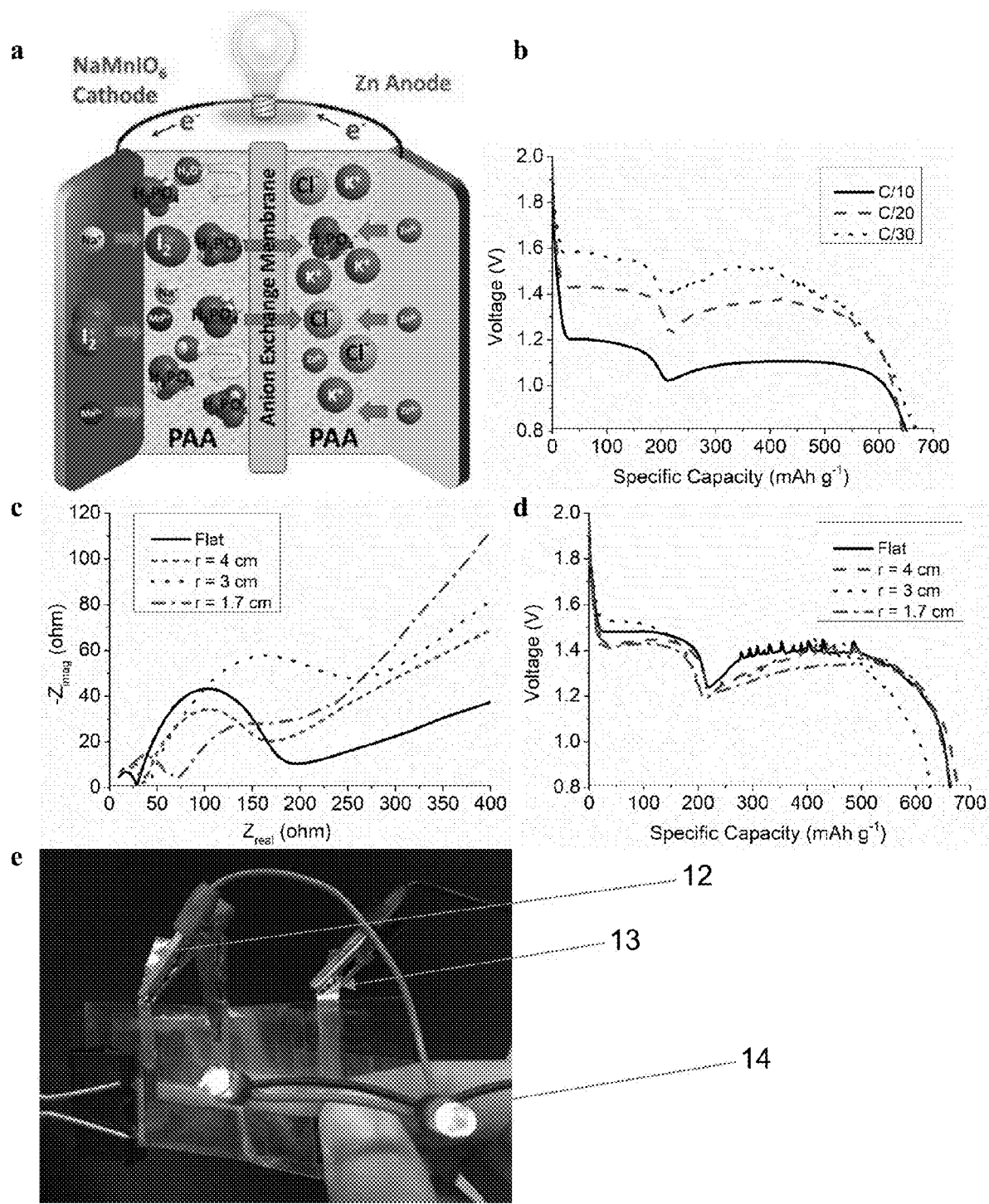
FIGS. 3A-3E show (a) a schematic diagram of a flexible $NaMnIO_6$—Zn cell; (b) a graphical depiction illustrating a rate performance of flexible $NaMnIO_6$—Zn cells; (c) a graphical depiction illustrating a Nyquist plot of a bent cell (5 MHz to 5 mHz); (d) a graphical depiction illustrating bending test results; (e) a photograph of two folded cells powering LED lights.

Scheme of a finalized flexible NaMnIO$_6$—Zn cell is shown in FIG. 3A. The thickness of a typical cell is 1.4 mm, which can be further cut using thinner carbon cloth and packaging materials. Batteries were discharged under various rates (FIG. 3B). As foreseen, higher discharge rates caused lower output voltages.

Due to the relatively low ionic conductivity of polymeric electrolytes and H$_3$PO$_4$, all voltages were lower than in aqueous electrolytes. Compared with lithium-based systems, this system is more suitable for low-rate discharge. Bending tests showed that cells remained functional under bending conditions, with no significant capacity drop. The capacity under C/20 lies around 650 mAh g$^{-1}$ (approximately 3.64 mAh cm$^{-2}$). This corresponded with approximately 81% of its theoretical capacity, and 211% of MnO$_2$.

It was also found herein that assembly and sealing had more impact on cell performance than bending. Impedance spectroscopy results (FIG. 3C) showed that impedance increased when a cell was bent. Migration and diffusion of ions were hindered, levitating Warburg impedance. The equivalent series resistance showed a similar trend. One explanation was that during bending, part of the polymer layer, either on cathode or anode side lost contact with the separator.

Yet performance tests did not show obvious trends of capacity or potential change brought up by bending (FIG. 3D). Two of such bent cells having current collectors 13 and 12 for anode and cathode current collectors, respectively, were connected in serial powering up LED lights 14 were shown in FIG. 3E. Current collectors 13 and 12 for anode and cathode current collectors are similar in function and properties to anode current collector 2 and cathode current collector 1, respectively, previously shown and described.

Figure 4:
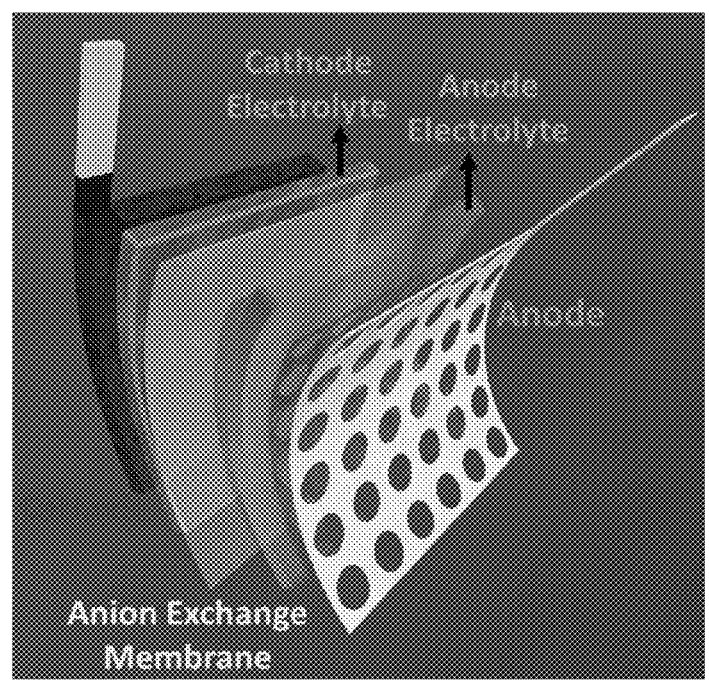
FIG. 4 shows the structure of a flexible double-electrolyte battery cell.
Figure 5A:
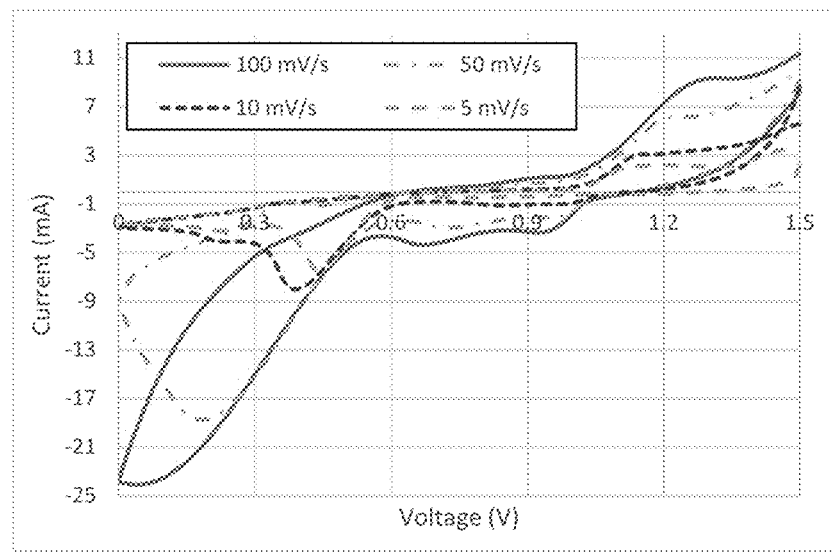
FIG. 5A-5C show the Cyclic Voltammogram of the double-salt periodate $NaMnIO_6$ cathode in $H_3PO_4$ (a) under different scan rates; and (b), (c) cycling properties at 20 mV/s.
Figure 5B:
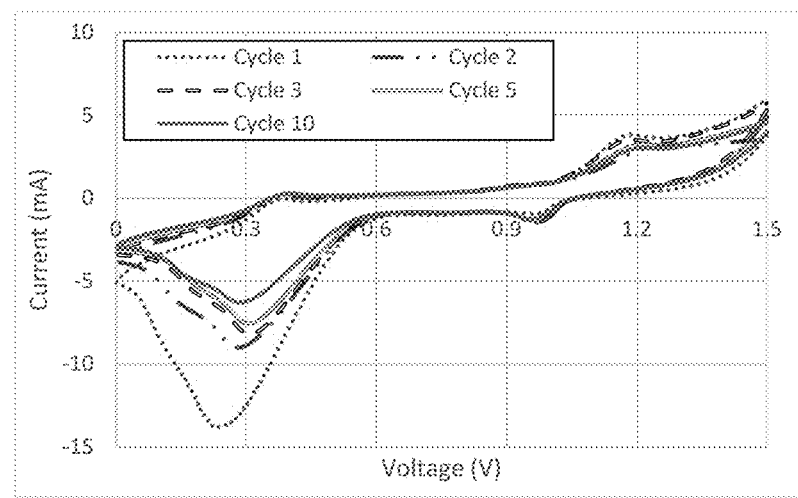
Figure 5C:
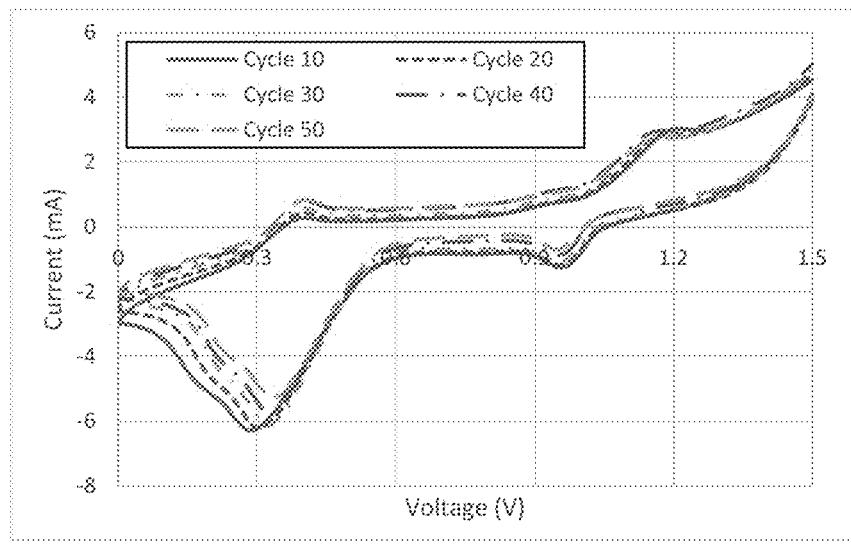

It is believed that an improved sealing system, as well as a more effective anion-exchange membrane separator, would improve both stability and electrochemical performance. The layer-by-layer structure of the flexible cells is shown in FIG. 4. Three reduction peaks were observed corresponding with the reduction of I(VII), I(V) and Mn(IV) from cyclic voltammetry (FIG. 5A-5C). These are the sources of electric capacity delivered by NaMnIO$_6$ electrode. Iodine in other iodates and periodates would also exhibit such properties, though the peak positions might vary due to the impact from cations.

An ion exchange membrane, or depending on the embodiment, anion-exchange-membrane maintains a desired pH of lower than 2 for the cathode and higher than 5.5 for the anode, block movement of H$^+$ ions to anode that cause anode corrosion, and a polymer such as poly(acrylic acid) (PAA) fortifies the cathode to enhance flexibility and avoid free-flow of electrolyte liquid. This pH value is an example for only where used is a dual quasi-solid phosphoric acid-potassium chloride (H$_3$PO$_4$—KCl) electrolytes for a cathode electrolyte-anode electrolyte combination. The ion exchange membrane allows only specific ions to permeate through it. In this case, for the dual (H$_3$PO$_4$—KCl) electrolytes, the anion-exchange membrane is blocking H$^+$ cations.

Flexible NaMnIO$_6$—Zn batteries are developed using poly(acrylic acid)-based dual-electrolytes in one embodiment. Cathode PAA-H$_3$PO$_4$ electrolyte layer ensured flexibility and provided necessary ions for reactions. Anode PAA-KOH—KCl electrolyte replaced the free-flow electrolytes to adapt to thin-film flexible design. Optimized batteries showed the cathode specific capacity of 650 mAh g$^{-1}$, equivalent to 81% of theoretical value and higher than traditional materials like Ag$_2$O and MnO$_2$.

The non-free-flow PAA based electrolytes made it possible to convert regular batteries into flexible and conformal designs, expanding the possible applications. The layer-by-layer dual-electrolyte design can also be extended to other battery systems (FIG. 4). The electrode and electrolyte inks are viable for commercial printing techniques like screen-printing and ink dispensing to fabricate flexible electrodes.

EXAMPLES—EXPERIMENTAL SECTION

In one embodiment, the NaMnIO$_6$ was prepared by a precipitation reaction. MnSO$_4$ solution was added into NaIO$_4$ solution, before the product was filtered, washed, and dried. Typical cathode ink was prepared by mixing NaMnIO$_6$, polyvinylpyrrolidone (PVP) and carbon black in deionized (DI) water. Current collectors were glued onto flexible polyethylene terephthalate (PET) substrates, before cathode ink as pasted and dried. Zinc tape mesh served as not only anode but also the current collector. Anodes were in excess in all the cells.

Typically, the cathode electrolyte was prepared via dissolving poly(acrylic acid) (PAA) in DI water, before H$_3$PO$_4$ was added. Then the cathode electrolyte was spread on an electrode and partially dried.

The anode electrolyte was prepared by mixing PAA, DI water, and stoichiometric amount of a salt such as Na$_2$SO$_4$ or KCl. To lessen zinc corrosion, KOH or NaOH was also added into PAA solution for partial neutralization. Various amounts were tried for easier fabrication. The mass after drying was adjusted based on the concentration of salts and the initially applied solution volume so that the concentration of PAA and water after drying were maintained the same for electrolyte comparison and optimization.

In optimized batteries, the electrode formulations were the same as mentioned before. Both electrodes have larger areas. The cathode material loading was 7 mg cm$^{-2}$; while the zinc mesh anode had an open area of 37.4%, with round holes uniformly distributed to facilitate bending. Cathode electrolyte solution was made by mixing PAA, DI water, and H$_3$PO$_4$. Cathode electrolyte was dried to form a PAA-H$_3$PO$_4$ layer (FIG. 1B). Anode PAA-KOH polymer solution (pH 7-8) containing KCl was totally dried before small amount of saturated KCl was added and absorbed by the polymer layer (FIG. 1C). This way, the amount of liquid can be better controlled.

In one embodiment, the battery was thermally sealed with an anion exchange membrane separator sandwiched between electrodes. An assembled cell is shown in FIG. 1D. Unless other wisely specified, cells were tested under C/20 constant current discharge modes. The flexible batteries were firmly attached over solid cylinder substrates of certain radii and tested to evaluate electrochemical performance under bending conditions.

While exemplary embodiments have been described herein, it is expressly noted that these embodiments should not be construed as limiting, but rather that additions and modifications to what is expressly described herein also are included within the scope of the invention. Moreover, it is to be understood that the features of the various embodiments described herein are not mutually exclusive and can exist in various combinations and permutations, even if such combinations or permutations are not made express herein, without departing from the spirit and scope of the invention.

What is claimed is:

1. A flexible battery comprising:
a plurality of current collectors including a positive current collector and a negative current collector;
an insoluble solid iodate or a periodate cathode, and an anode, wherein the cathode is in communication with the positive current collector and the anode is in communication with the negative current collector;
at least one electrolyte forming a cathode electrolyte and an anode electrolyte, wherein the cathode is in communication with the cathode electrolyte and the anode is in communication with the anode electrolyte;
a separator for separating the cathode and the anode; and
at least one of the cathode electrolyte or the anode electrolyte is embedded in a polymer for enhancement of electrode flexibility and avoidance of free-flow of liquid electrolyte; and
wherein the cathode is a multi-salt periodate containing more than one metal or hydrogen, or an iodate.

2. The flexible battery of claim 1, wherein the cathode electrolyte and the anode electrolyte are different electrolytes.

3. The flexible battery of claim 2, wherein the flexible battery is a flexible aqueous battery and the cathode electrolyte and/or the anode electrolyte are an aqueous electrolyte and wherein the cathode electrolyte and the anode electrolyte have different pHs, redox properties, ionic conductivity, or mechanical strength.

4. The flexible battery of claim 2, wherein the cathode electrolyte and the anode electrolyte are a dual quasi-solid polymer based electrolytes and the polymer is a poly(acrylic acid) (PAA) and the cathode is a sodium manganese periodate (NaMnIO$_6$) cathode with a poly(acrylic acid)(PAA)-phosphoric acid (H$_3$PO$_4$) layer as the cathode electrolyte, and the anode electrolyte is a poly(acrylic acid)(PAA)-potassium chloride layer.

5. The flexible battery of claim 2 wherein the separator is an ion-exchange membrane sized to separate the electrolytes.

6. The flexible battery of claim 1, wherein the cathode electrolyte and the anode electrolyte are dual quasi solid electrolytes.

7. The flexible battery of claim 1, wherein the polymer is a poly(acrylic acid) (PAA); and the cathode electrolyte and the anode electrolyte are both a poly(acrylic acid) (PAA) based electrolytes.

8. The flexible battery of claim 1, wherein the multi-salt periodate cathode contains an element selected from a group consisting of Na, Rb, K, and any combination thereof.

9. The flexible battery of claim 1, wherein the multi-salt periodate cathode contains an element selected from a group consisting of Mn, Pb, Fe, Co, Cr, Ni, Ag, Sn, Ge, Ba and any combination thereof.

10. The flexible battery of claim 1, wherein the cathode is a Fe periodate cathode or Ag periodate cathode.

11. The flexible battery of claim 1, wherein the polymer is a poly(acrylic acid)(PAA) and the cathode electrolyte and the anode electrolyte are a poly(acrylic acid)(PAA) based phosphoric acid-potassium chloride (H$_3$PO$_4$—KCl) electrolytes.

12. The flexible battery of claim 1, wherein the polymer is a poly(acrylic acid)(PAA) and the cathode electrolyte is a poly(acrylic acid)(PAA) based phosphoric acid (H$_3$PO$_4$).

13. The flexible battery of claim 1, wherein the polymer is poly(acrylic acid)(PAA) and the anode electrolyte is a poly(acrylic acid)(PAA) based potassium chloride (KCl).

14. The flexible battery of claim 1, wherein the cathode is an iodate cathode that includes an element selected from a group consisting of Mn, Pb, Fe, Zn, Cr, Cu, Ag, Ba, and any combination thereof.

15. The flexible battery of claim 1, wherein the cathode is a sodium manganese periodate (NaMnIO$_6$) cathode.

16. The flexible battery of claim 1, wherein the positive current collector is a carbon fabric.

17. A flexible battery, comprising:
a periodate cathode containing polyvinylpyrrolidone (PVP) binder or an iodate cathode containing polyvinylpyrrolidone (PVP) binder; wherein a poly(acrylic acid) PAA is part of an electrolyte for the cathode;
a zinc-based anode;
a dual quasi-solid phosphoric acid-potassium chloride (H$_3$PO$_4$—KCl) electrolytes for a cathode electrolyte-anode electrolyte combination;
an anion-exchange membrane separating the cathode electrolyte and the anode electrolyte; and
wherein the anion-exchange-membrane maintains a desired pH of lower than 2 for the cathode and higher than 5.5 for the anode, blocks movement of H$^+$ ions to anode that cause anode corrosion, and poly(acrylic acid) fortifies the cathode to enhance flexibility and avoid free-flow of electrolyte liquid.

18. A method of making a flexible battery, comprising:
forming a flexible battery that includes:
a plurality of current collectors including a positive current collector and a negative current collector;
an insoluble solid iodate or a periodate cathode, and an anode, wherein the cathode is in communication with the positive current collector and the anode is in communication with the negative current collector;
at least one electrolyte forming a cathode electrolyte and an anode electrolyte, wherein the cathode is in communication with the cathode electrolyte and the anode is in communication with the anode electrolyte;
a separator for separating the cathode and the anode; and
at least one of the cathode electrolyte or the anode electrolyte is embedded in a polymer for enhancement of electrode flexibility and avoidance of free-flow of liquid electrolyte; and
wherein the cathode is a multi-salt periodate cathode containing more than one metal or hydrogen.

19. The method of claim 18, further wherein the plurality of current collectors includes printing electrode inks onto the current collectors, drying the electrode inks, and then fortifying by the non-fluid electrolyte layers for flexibility and mechanical strength.

* * * * *